United States Patent [19]

Cheung et al.

[11] Patent Number: 5,052,733

[45] Date of Patent: Oct. 1, 1991

[54] CEILING SIGN INSTALLATION POLE

[76] Inventors: Victor Cheung, 1396 Chatley Way, Woodstock, Ga. 30188; Matthew K. Haggerty, 25 Centre St., Milton, Mass. 02186

[21] Appl. No.: 479,978

[22] Filed: Feb. 14, 1990

[51] Int. Cl.[5] ........................ A47F 13/06; F16M 13/00

[52] U.S. Cl. .................................... 294/19.1; 248/340

[58] Field of Search ................. 294/19.1, 85; 248/339, 248/340, 343, 544, 228; 403/229; 40/617, 666

[56] References Cited

U.S. PATENT DOCUMENTS

| | | | |
|---|---|---|---|
| 3,016,556 | 1/1962 | Greenleaf | 403/229 X |
| 3,327,376 | 6/1967 | Freeman et al. | 294/19.1 X |
| 4,135,692 | 1/1979 | Ferguson | 248/228 X |
| 4,163,576 | 8/1979 | Hoop | 294/19.1 |
| 4,225,108 | 9/1980 | Jaroche | 294/19.1 X |
| 4,269,087 | 5/1981 | Wand . | |
| 4,323,215 | 7/1982 | Berger . | |
| 4,564,165 | 1/1986 | Grant et al. . | |

OTHER PUBLICATIONS

"Ladderless Clips and Poles", advertisement in *Hang-Ups Unlimited.*

"Jet System", advertisement in *The Point of Sale Centre.*

*Primary Examiner*—Margaret A. Focarino
*Assistant Examiner*—Dean J. Kramer
*Attorney, Agent, or Firm*—Robert M. Asher

[57] ABSTRACT

A ceiling sign installation pole having a slot for carrying an anchor and an intersecting slot for permitting the exiting of a hook hung from the anchor. The installation head has a flat surface with two bumps for lifting adjacent ceiling tiles out of the way during the installation process. The walls of the exit slot bevel outwards towards the bottom of the installation head. Additional slots may be provided for different sized anchors. A flexible joint is used to connect the installation head to an elongated pole.

18 Claims, 3 Drawing Sheets

CEILING SIGN INSTALLATION POLE

BACKGROUND OF THE INVENTION

The present invention relates to a pole for installing and removing ceiling anchors and sign displays on the flanged rails of a ceiling. In particular, the pole is for use in installing spider anchors, magnetic or adhesive anchors.

A spider anchor is a clip which twists onto a flanged rail of a dropped ceiling. The clip grasps both edges of the railing to secure itself in place. The anchor has a loop which is suspended from the ceiling. A hook may be inserted through the loop. The hook may be used to hold up a sign from the ceiling of a store.

The general practice for securing a spider anchor to the railing of a ceiling is to get up on a ladder and manually twist the anchors into place. In fact, since when putting up a sign two ends of the sign must be suspended from the ceiling, it is often necessary to move two ladders through the store when putting signs up. It is an object of the present invention to provide a pole which may be used to secure and remove spider anchors and signs to a ceiling without the need for a ladder.

SUMMARY OF THE INVENTION

This invention is directed to an installation pole which includes a pole attached through a flexible joint to an installation head. The installation head includes a slot in which a spider anchor sits when it is being installed. A hook is hung from the anchor. A second slot intersecting with the anchor slot provides an exit so that the installation pole can be moved away from the hanging hook after installation. Thus, in using the installation pole of the present invention, the ceiling anchor can be installed along with the hook and even the sign all at the same time. To install a sign, two installation poles are used by two persons to raise and attach two ceiling anchors on either side of the sign to the ceiling at the same time. The present invention enables signs to be hung or removed from high ceilings without the need for ladders.

The walls forming the exit slot in the installation head are preferably bevelled outwards towards the bottom of the head in order to properly orient the hook when the installation head is lowered from the installed ceiling anchor. Bumps are provided on the top of the installation head to push the ceiling tiles out of the way during the installation operation. The pole may be advantageously attached to the installation head through a flexible joint so that the pole may be held at an angle while the installation head remains flat against the ceiling rail. The installation head may also include a third slot to accommodate other ceiling anchors such as magnetic or adhesive type.

Other objects and advantages of the present invention will become apparent during the following description of the presently preferred embodiment of the invention taken in conjunction with the drawings.

DETAILED DESCRIPTION OF THE PREFERRED EMBODIMENT

Figure 1:
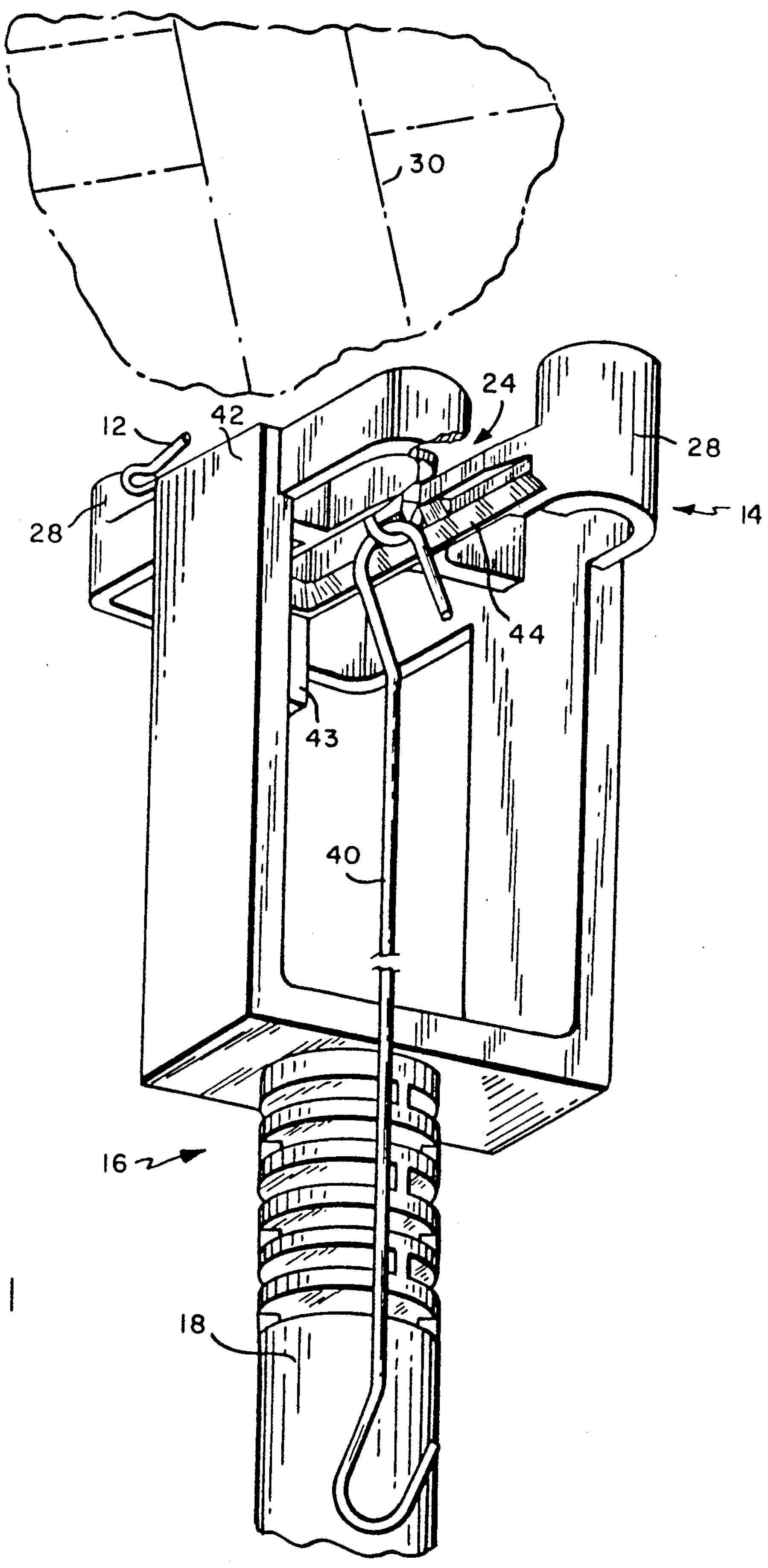
FIG. 1 is an isometric view of the installation pole of the present invention with a ceiling anchor and hook hanging therefrom.

Referring now to the drawings, FIG. 1 shows the installation pole of the present invention being used to lift a spider anchor and hook up towards the ceiling. The spider anchor 12 is supported on the installation head 14 which is provided at one end of the installation pole. The installation head is attached by a flexible joint 16 to an elongated rod 18. The elongated rod 18 may be an aluminum telescoping pole which can be extended to various heights to accommodate a wide variety of ceiling heights. In using the installation pole to attach the spider anchor 12 to a ceiling rail 30, the installation head should be placed flat against the rail 30. The flexible joint 16 permits the head to flatten against the ceiling rail while the elongated pole 18 may be held at an angle by the user. The flexible joint 16 may be any universal type of joint. It may be made from a series of plastic or rubber discs or may be formed using a bearing and spring mechanism or any other flexible joint available to the art.

Figure 2:
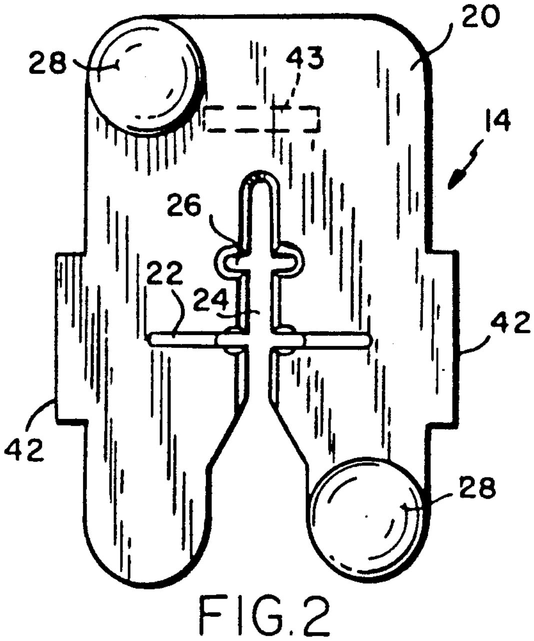
FIG. 2 is a plan view of the installation pole of the present invention.
Figure 4:
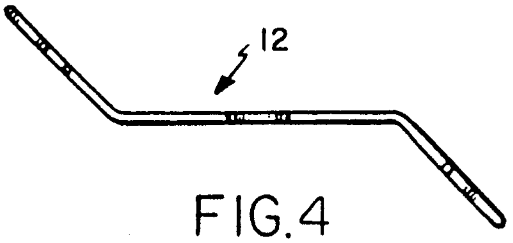
FIG. 4 is a plan view of a spider anchor for use with the present invention.
Figure 4A:
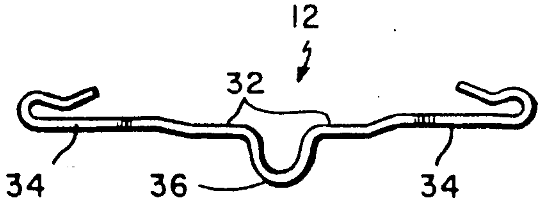
FIG. 4A is a side view of the spider anchor of FIG. 4.

The installation head 14 has a flat top surface 20 provided with an arrangement of slots, as shown in FIG. 2. In accordance with the presently preferred embodiment, the installation head 14 and the flexible joint 16 are made from a plastic, such as acetal manufactured by Dupont under the name Delrin. A spider anchor slot 22 is provided in the top surface 20 for supporting a spider anchor when it is being lifted or lowered from the ceiling. The arms of the spider anchor 12 each have a recessed portion 32 which fits down into the slot 22. The outer portion 34 of the arms of the spider anchor 12 rests on the flat surface 20 of the installation head, holding the anchor up on the installation head. The center of the spider anchor is a loop 36 for suspending a hook. The opposing walls of the slot 22 restrict lateral movement of the spider anchor 12. In particular, the corner portions of the slot 22 formed at the intersection with an exit slot 24 secure the sides of the loop 36 in place within the slot 22. Thus, the spider anchor does not rotate about its axis nor does it rotate laterally on the installation head surface. However, the installation head does not provide any restraint against the spider anchor being removed vertically from the installation head. This permits the head to be removed from the spider anchor once it has been attached to the ceiling.

The exit slot 24 permits the spider anchor to be lifted along with a hook 40 suspended therefrom. Once the spider anchor has been installed on the ceiling rail, the installation pole is lowered so that the installation head surface 20 clears the bottom of the anchor. Then the installation head 14 ca be removed away from the new installation, by directing it so that the hook 40 passes out through the exit slot 24. The exit slot 24 widens out at the outer edge of the installation head. This facilitates the process of removing an anchor. The wider opening makes it easier to direct a hook through the exit slot, when the installation head is raised to a anchor which is to be removed.

Figure 5:
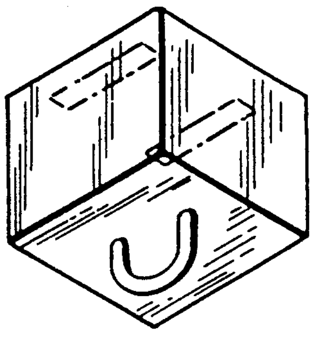
FIG. 5 is an isometric view of a magnetic type anchor for use with the present invention.

The installation head 14 may be provided with another slot 26 which also intersects the exit slot 24. In accordance with the presently preferred embodiment, the slot 26 is made to accommodate other ceiling anchors having different size loops such as a magnetic anchor, one of which is shown in FIG. 5, or an adhesive anchor. The loop from such an alternate anchor is supported within the slot 26. The slot 26 is a different width than the spider anchor slot 22 so that the wider loop of a magnetic anchor or adhesive anchor fits in this slot 26. The exit slot 24 makes it possible to have a hook 40 hanging from the anchor while it is being installed. Just as with the spider anchors, once the magnetic anchor is attached to the ceiling rail, the installation head is lowered vertically from the ceiling to clear the anchor's loop. Then the installation head can be moved away with the installed hook passing out through the exit slot 24. The operation is the same with an adhesive with the advantage that it may be attached to any flat ceiling surface, but the disadvantage that the adhesive anchor is not readily removable.

Protruding upwards from the installation head surface 20 are two bumps 28. The bumps 28 are made higher than the ends of the spider anchor so that the ceiling tiles do not dislodge the spider anchor from its slot when it is lifted up to the ceiling. The two bumps 28 are located on opposite sides of both the spider anchor slot 22 and the exit slot 24. This leaves a sufficient flat area in between which will butt up against a ceiling rail. The bumps 28 push the ceiling tiles out of the way, while an anchor is secured to the ceiling rail.

In order to remove a spider anchor from a ceiling rail, the anchor slot 22 must be aligned with the spider anchor. To assist in this alignment, the installation head 14 of the presently preferred embodiment is provided with extensions 42 which when aligned with a ceiling rail having an attached spider anchor causes the slot 22 to align with the spider anchor. Alignment with the spider anchor on a ceiling rail may similarly be assisted by markings on the underside of the installation head.

The installation head 14 is further provided with a tab 43 extending down from the underside of the head. The tab 43 is used in suspending an installation from a ceiling rail. This is helpful especially when one person is handling two poles to put up or take down a sign. For example, one pole can be used to remove one anchor and then suspended from a rail while a second pole detaches the other anchor. Then both poles can be lowered. To suspend the pole from a ceiling rail, the bump 28 pushes the ceiling tile upwards. The back portion of the underside of the installation head rests on the top side of the ceiling rail. The ceiling tile weighs down on the bump 28 holding the installation head against the ceiling rail. The tab 43 butts against the edge of the ceiling rail to keep the pole from tipping off the rail.

Figure 3:
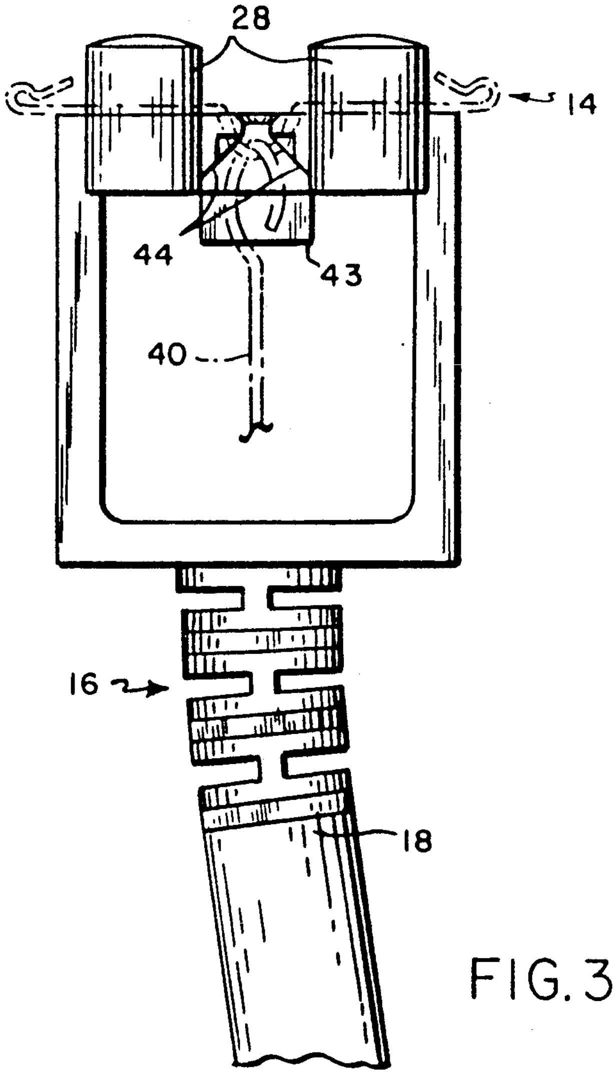
FIG. 3 is a side view of the installation pole of the present invention.

Referring now to FIG. 3, it is seen that a hook 40 may be cocked at an angle as it is dangled from the loop of a spider anchor. Once the anchor is put in place on a ceiling rail, the installation head must be lowered from the anchor. When the head is lowered the hook 40 must be directed through the exit slot 24. In order to orient the hook 40 with the exit slot 24 as the installation head is lowered, the walls of the slot 24 are bevelled outwards towards the bottom side of the installation head. The bevelled area 44 is shown in FIG. 3.

Figure 6:
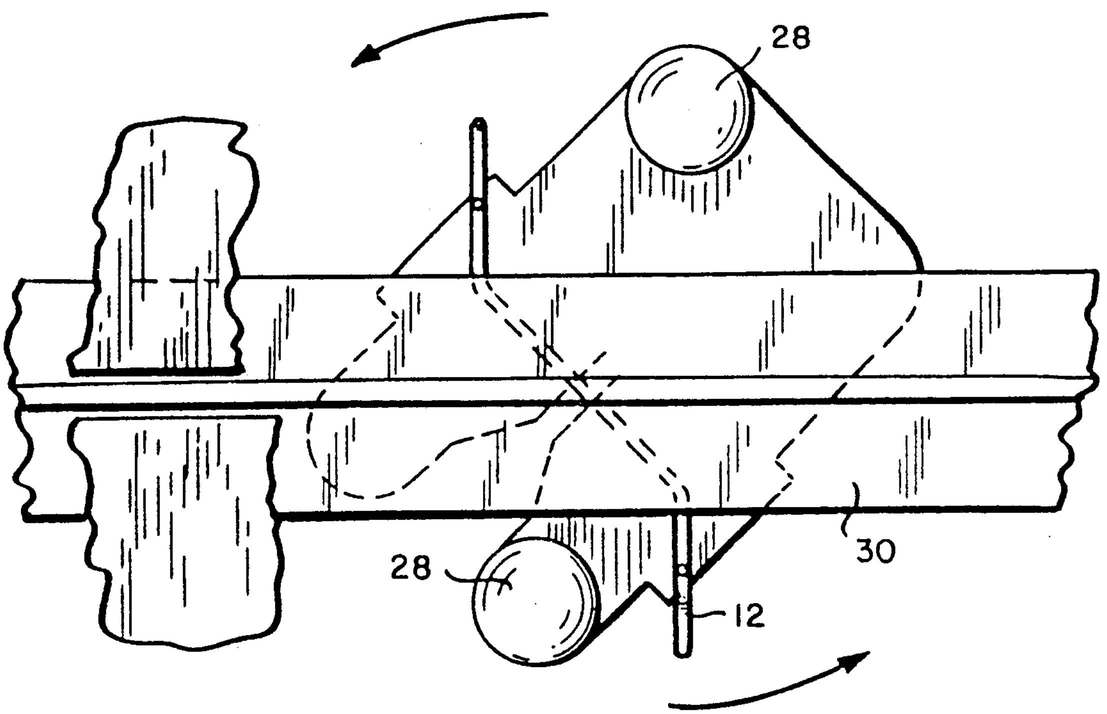
FIG. 6 is a view from above a ceiling rail during an installation by the present invention.

Having described the installation pole itself, now the process for installing a spider anchor shall be described with reference to FIG. 6. In order to gain maximum use out of the installation pole of the present invention, two such poles are used simultaneously to hang the two ends of a sign from a ceiling. Thus, a spider anchor is inserted in slot 22 of each of the two installation heads. A hook 40 is suspended from the loop 36 on each of the spider anchors 12. A sign may then be suspended from the bottoms of the hooks so as to provide a hook on either end of the sign. The installation poles are then raised to the ceiling. The installation head surface 20 is pressed flat against a ceiling rail, the rail passing across the middle of a spider anchor. The bumps 28 push the adjacent ceiing tiles out of the way. Then the installation pole is twisted in the direction shown in FIG. 6 in order to swing the tangs of the spider anchor over the edges of the ceiling rail. When the spider anchor is securely in place, the installation pole is lowered from the ceiling. The bevelled underside edges 44 orient the hook 40 within the exit slot 24. The installation pole can then be pulled away from the installation, the hook 40 passing through the exit slot 24. When the two hook and anchors are installed simultaneously for a single sign, the sign installation is completed without the need for any ladders.

When installing a sign with magnet anchors, the anchor is inserted into the other slot 26 on the installation head. The installation process is the same as for the spider anchors, except that there is no twisting step. The magnet is simply stuck to the ceiling rail.

Figure 7:
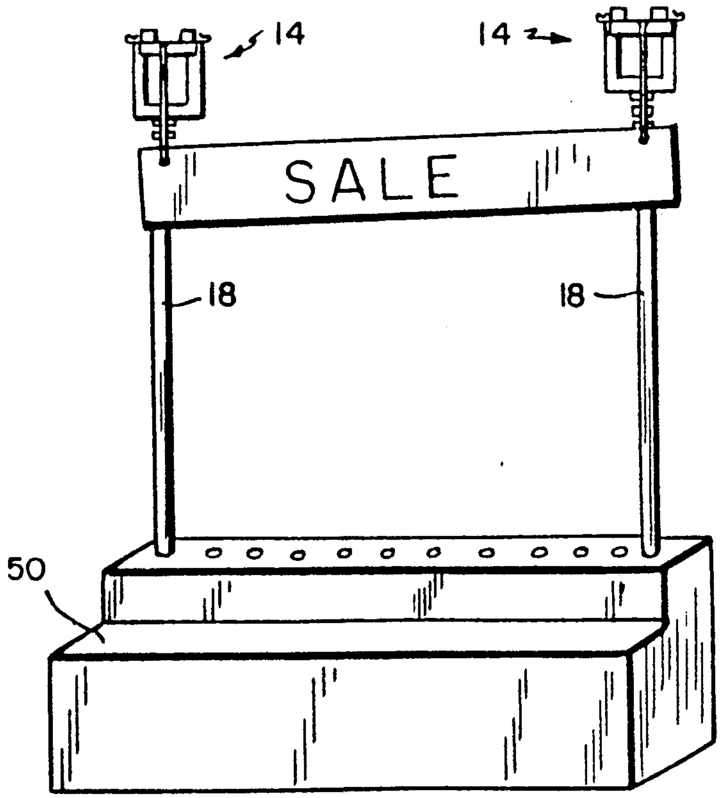
FIG. 7 is a side view of a pole stand for use with the present invention.

The method just described generally requires two persons, each operating an installation pole. It is contemplated that there may be times when only a single person is available for installation of a sign on a ceiling. A pole stand 50 shown in FIG. 7 may be used to enable a single person to install a sign on a ceiling using the installation pole of the present invention. The pole stand is essentially a sturdy box with a series of holes along its top surface. Two installation poles can be inserted through two holes in the pole stand 50. They are positioned apart a distance appropriate for the sign that would be hung between the poles. A spider anchor is placed in the installation head of each of the poles. Hooks are hung from the loops of the anchors and a sign is suspended by the hooks. The telescoping poles 18 may then each be raised a little at a time so that the sign does not get tilted at too great an angle such that it falls off. When the two poles have been raised to the ceiling, the spider anchors may be twisted into place one at a time as described above. Thus, it is possible with the present invention for a single person to install a sign on a ceiling without the use of a ladder.

Embodiments of the present invention are intended to be merely exemplary and those skilled in the art should be able to make numerous variations and modifications to them without departing from the spirit of the present invention. All such variations and modifications are intended to be within the scope of the present invention a defined in the appended claims.

We claim:

1. An installation pole comprising:

an installation head having a flat top surface area;

means, connected to said installation head, for preventing a ceiling anchor from lateral movement relative to said head;

an exit slot in said installation head located proximate to said preventing means, to permit said head to be moved away from said anchor while a hook hanging from said anchor passes out through said exit slot;

an elongated rod attached beneath said installation head for lifting the ceiling anchor on said installation head against a ceiling rail so that the flat top surface area of said installation head maintains said installation head substantially parallel with said ceiling rail when said rod is twisted to attach or remove said anchor; and extensions of the flat surface area of said installation head which can be seen from beneath said head, said extensions being oriented so as to assist in aligning said installation head against said ceiling rail when attaching or removing said anchor.

2. The installation pole of claim 1 further comprising a flexible joint for attaching said elongated rod to said installation head.

3. The installation pole of claim 1 further comprising means for orienting said hook in said exit slot when said installation head is lowered away from said ceiling anchor.

4. The installation pole of claim 1 further comprising means extending up from said installation head for lifting ceiling tiles when a ceiling anchor is being attached to a ceiling rail.

5. The installation pole of claim 1 wherein said means for preventing lateral movement comprises a slot in said installation head.

6. The installation pole of claim 1 wherein said installation head includes a bottom side which extends outwards from a projected axis of said rod, the bottom side being oriented such that it may rest atop a ceiling cross beam while said installation head lifts a corresponding ceiling tile off from said ceiling cross beam.

7. The installation pole of claim 6 further comprising a tab extending down from the bottom side of said installation head to support said installation head when it is suspended from said ceiling rail.

8. An installation pole comprising:

an installation head having a bottom side and a top surface area bounded by an outer edge;

a first slot formed in and at least partially across said top surface area by two opposing walls;

a second slot formed in said top surface area intersecting said first slot, said second slot extending from the outer edge of said head at least partially across said top surface area to at least the intersection with said first slot; and an elongated rod coupled to the bottom side of said installation head, for lifting the top surface area of said installation head against a ceiling rail so as to guide said installation head substantially parallel with said ceiling rail when said rod is twisted to attach or remove a ceiling anchor.

9. The installation pole of claim 8 wherein said second slot is formed by two opposing walls which bevel outwards in the direction of the bottom portion of said installation head.

10. The installation pole of claim 8 further comprising a pair of bumps protruding up from the top surface of said installation head, said bumps being positioned on opposite sides of said first and second slots.

11. The installation pole of claim 10 further comprising a tab extending down from the bottom side of said installation head to support said installation head against a ceiling rail when said head is suspended between said rail and a ceiling tile.

12. The installation pole of claim 8 further comprising a flexible joint attached between said elongated rod and said installation head.

13. The installation pole of claim 8 further comprising a third slot in said top surface area intersecting said second slot and having a different width than said first slot.

14. The installation pole of claim 8 wherein said second slot widens out at the outer edge of said installation head.

15. An installation pole comprising:

an installation head having a flat top surface and a bottom portion;

two bumps protruding up from the flat top surface of said installation head;

a first slot formed in said installation head so that an anchor sitting in said slot is secured against lateral movement when said head is rotated in the plane of said top surface;

a second slot in the flat top surface, said second slot intersecting said first slot;

an elongated rod coupled to the bottom portion of said installation head for lifting the installation head up towards a ceiling so as to orient the plane of said top surface adjacent a plane of a ceiling rail; and extensions from said installation head which align said first slot with an anchor attached to said ceiling rail when said extensions are brought into alignment with said ceiling rail.

16. The installation pole of claim 15 further comprising a flexible joint connected between said installation head and said elongated rod.

17. The installation pole of claim 15 further comprising a third slot intersecting said second slot and having a different width than said first slot.

18. A method for hanging a hook from a ceiling rail comprising the steps of:

inserting a ceiling anchor into a slot in an installation head;

hanging a hook from said ceiling anchor;

lifting said installation head to a ceiling beam and orienting said installation head against said ceiling beam and said ceiling anchor across said beam;

rotating said installation head, while maintaining said head substantially parallel with said ceiling beam, to secure said ceiling anchor to said ceiling beam;

lowering said installation head from said ceiling anchor; and moving said installation head away from said anchor and hook in a direction such that said hook passes through an exit slot in said installation head as said head is moved.

* * * * *